United States Patent [19]

Zolman et al.

[11] 4,071,934
[45] Feb. 7, 1978

[54] CFT BOX FIN

[75] Inventors: Junior O. Zolman; Carl O. Griewahn, both of Adrian, Mich.

[73] Assignee: Brazeway, Inc., Adrian, Mich.

[21] Appl. No.: 623,241

[22] Filed: Oct. 17, 1975

[51] Int. Cl.² .............................................. B23P 15/26
[52] U.S. Cl. ................................. 29/157.3 A; 165/177
[58] Field of Search ................... 29/157.3 A, 157.3 R, 29/157.3 B

[56] References Cited

U.S. PATENT DOCUMENTS

| | | | |
|---|---|---|---|
| 2,347,957 | 5/1944 | McCullough | 29/157.3 A |
| 3,224,503 | 12/1965 | Konanz | 29/157.3 A |
| 3,333,317 | 8/1967 | Shockley | 29/157.3 A |
| 3,436,948 | 4/1969 | Portal et al. | 29/157.3 A X |
| 3,659,326 | 5/1972 | Keith | 29/157.3 A |
| 3,695,347 | 10/1972 | Chartet | 29/157.3 X |

Primary Examiner—C.W. Lanham
Assistant Examiner—V. Rising
Attorney, Agent, or Firm—Krass & Young

[57] ABSTRACT

An integral fin/tube combination of extruded aluminum wherein the fins are shredded into parallel radial strips which are bent into alternately upwardly and downwardly peaked configurations. Shredding may be accomplished by means of a die set.

7 Claims, 9 Drawing Figures

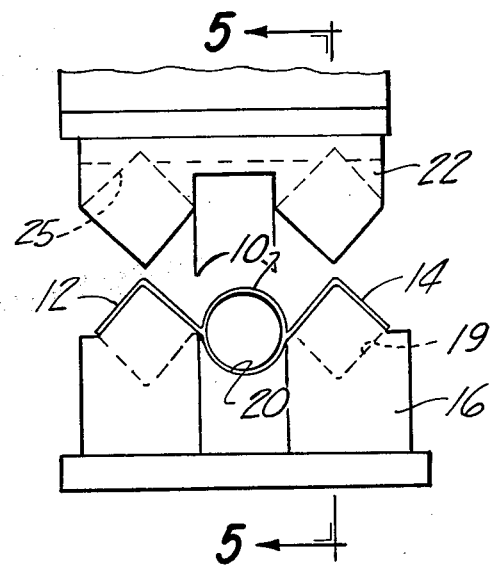
Fig-4
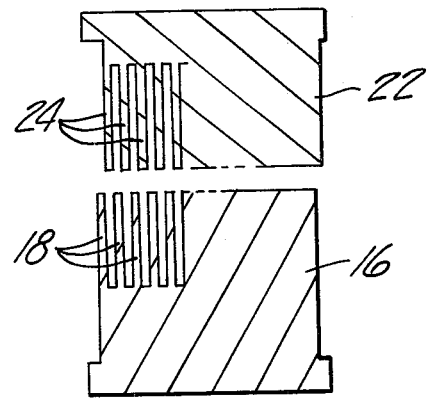
Fig-5
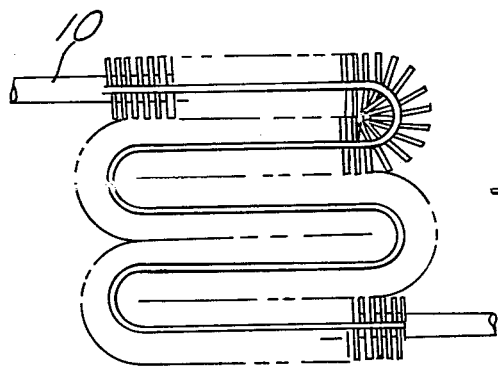
Fig-6
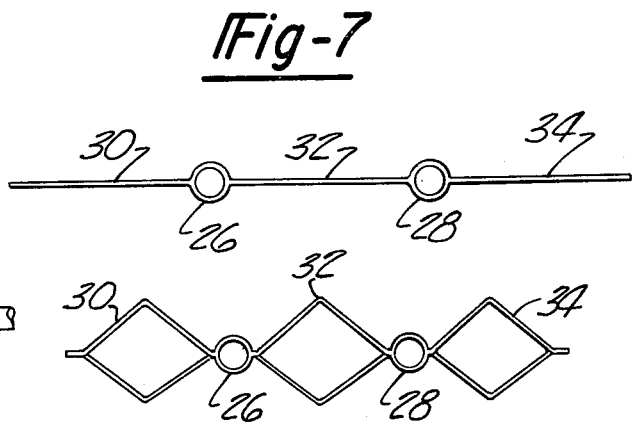
Fig-7
Fig-8
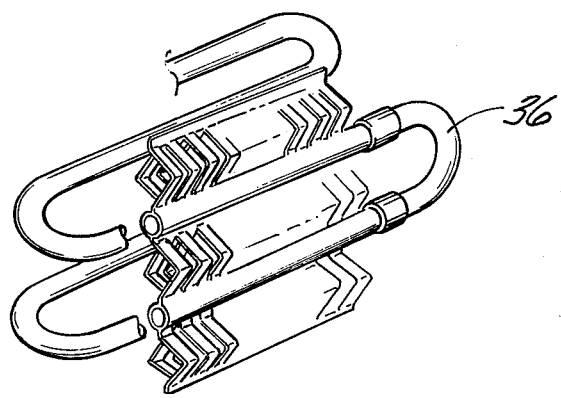
Fig-9

CFT BOX FIN

INTRODUCTION

This invention relates to an integral, extruded, dimensionally conformable fin/tube combination for use in heat exchangers and to a method of manufacture therefor.

BACKGROUND OF THE INVENTION

Fin/tube combinations are well known for use as heat exchangers wherein the tube forms a fluid conduit and the fin effects a thermal exchange between fluid in the tube and the surrounding environment. One approach to the manufacture of such articles comprises the extrusion of the tube, the stamping of the fins and the subsequent assembly of fins and tube. Although many satisfactory techniques are known for assembling the fins and tube, there exists both an economic advantage as well as a performance advantage in the physical integration of the fin and tube along with the resulting elimination of the assembly steps.

A number of prior art methods are known for extruding integral fin/tube combinations and thereafter performing operations on the extruded fin to shape the fin into an efficient heat exchange configuration; one such example is shown in the patent to Shockley U.S. Pat. No. 3,333,317, wherein a continuous rotary die is operative to form the fin into the desired configuration. However, the fin of Shockley is radially non-compliant, i.e., stiff, giving rise to a finished article which may be difficult to install in an enclosure of defined size and shape.

BRIEF DESCRIPTION OF THE INVENTION

The present invention provides an integral extruded fin/tube combination as well as a method of manufacture therefor which eliminates the problems associated with the assembly of separate fins and tubes and which further provides the advantages of a resilient dimensionally conformable structure having efficient heat transfer properties. In general, this is accomplished by the formation of a relatively thin-walled tubular body having one or more radially extending fins integrally extruded therewith, the fins thereafter being shredded into a plurality of narrow, radially-extending, parallel strip-like portions which are alternately bent into reversely peaked configurations thus to provide radial compliance as well as a highly efficient thermal transfer configuration.

In the preferred embodiment, the shredding step is carried out using a die having complemental blade portions which interfit with one another to slice through the extruded fins. The slicing is carried out over a substantial portion of the radial dimension of the fin but does not extend fully to the extremity thereof.

The various features and advantages of the invention will be best understood by reference to the following description of a specific embodiment of the invention including a specific description of the article and the method of manufacture thereof.

DETAILED DESCRIPTION OF THE DRAWINGS

FIG. 4 is an end view of the die assembly with the fin/tube extrusion therein;

FIG. 5 is a side view of a die assembly;

FIG. 6 is a plan view of a shredded article bent into a serpentine configuration;

FIG. 7 is an end view of a double tube extrusion with integral fins prior to shredding;

FIG. 8 is an end view of the double tube extrusion after shredding; and,

FIG. 9 is a perspective view of a double tube extrusion with return bend tubes attached.

DETAILED DESCRIPTION OF THE ILLUSTRATIVE EMBODIMENT

Figure 1:
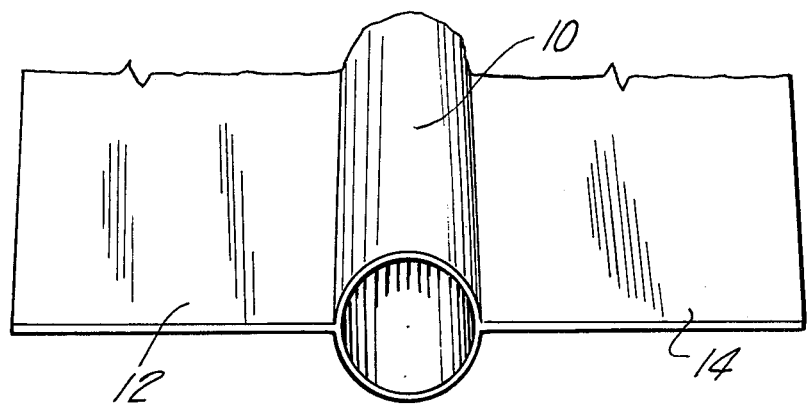
FIG. 1 is a perspective view of an extruded, integral fin/tube combination prior to shredding.
Figure 2:
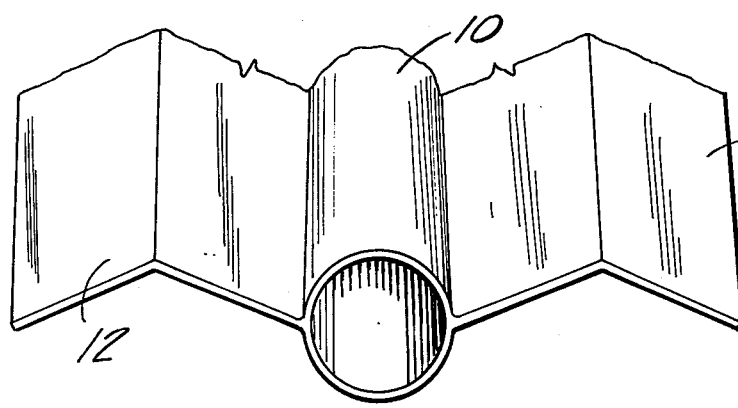
FIG. 2 is another view of the article after a roll-forming step.
Figure 3:
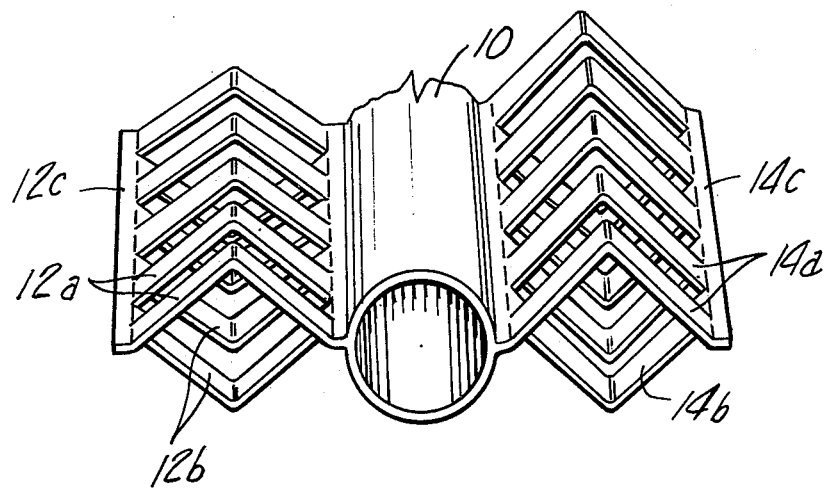
FIG. 3 is a perspective view of the fin/tube combination subsequent to shredding.

Referring to FIGS. 1 through 3, the production of articles in accordance with the invention comprises the extrusion of a straight, relatively thin-walled aluminum tube 10 having opposite radially extending and integral fins 12 and 14. Fins 12 and 14 may be initially straight and thereafter roll formed into the peaked configuration shown in FIG. 2 although this is not an essential step. Thereafter the fins 12 and 14 are shredded by means to be described to define alternately upwardly and downwardly peaked strip like sections 12a, 14a and 12b, 14b, respectively. The shredding operation involves substantially the entire interior area of each of the fins 12 and 14 but, in the preferred embodiment, is stopped short of the outer extremity thereby to define the solid unshredded extremity strips 12c and 14c, respectively. A short length immediately adjacent the tube 10 is also left intact as shown. Optionally it can be shredded to the tube body.

In the configuration of FIG. 3 the integral fin/tube combination is dimensionally conformable; i.e, the fins may be expanded or contracted in the lateral direction as viewed in FIG. 3. In addition, the tube may be bent into serpentine configurations of the type shown in FIG. 4, the strip-like sections of the shredded fins expanding and bunching in the bend areas. Accordingly, there is typically no need to trim the fins from the tube in the bend areas. In addition, the configuration of FIG. 3 exhibits extremely efficient heat transfer characteristics and frost resistance.

FIGS. 4 and 5 illustrate a die apparatus which may be used in carrying out the shredding operation. The apparatus comprises a lower die 16 having spaced parallel blade-like portions 18 on opposite sides of a sliding tube seat 20. The blades 18 are upwardly peaked to receive the roll formed fins 12 and 14 in the configuration of FIG. 2. The blade-like portions 18 are separated by uniform spaces of substantially the same thickness as the blades themselves and bounded by peaked surfaces 19 to receive the complemental spaced parallel blade-like portions 24 of upper die 22. Blade-like portions 24 of upper die 22 are spaced to receive the lower die blades 18 and are bounded by upwardly peaked surfaces 25. Upper die 22 also comprises a central sliding tube seat to hold the tube during shredding.

In operation, the extruded fin/tube combination is placed between the dies 16 and 22. The dies are then closed by a press (not shown) to shred the fins 12 and 14. In the shredding operation, the blades 24 of the upper die slice through spaced strip-like sections of the fins 12 and 14 pushing those strips into the reversely peaked configurations of 12b and 14b in FIG. 3. The die shredding operation is preferably carried out over relatively short sections; e.g., 6 to 10 inches of extruded fin/tube combination, the fin and tube advanced over the die and the shredding operation repeated in an intermittent fashion. As previously described, the roll forming of the upward peaks as shown in FIG. 2 is an optional step and, where used, is preferably carried out immediately prior to the shredding die. The fin/tube combination may also enter the shredding die flat or in a configuration which is generated by the original extrusion die.

The die set 16, 22 shown in FIGS. 4 and 5 is but one apparatus for shredding the fins 12 and 14; a meshing gearlike die arrangement is also possible in which case the intermittent movement of the fin/tube combination may be replaced with a substantially continuous movement.

It will also be understood that symmetrically opposed fin pairs of the type shown at 12, 14 in FIGS. 1 through 4 is not essential as non-symmetric fin/tube extrusions may also be shredded in accordance with the invention.

FIGS. 7 through 9 illustrate another embodiment of the invention comprising the integrated combination of extruded aluminum tubes 26 and 28, radially outwardly extending fins 30 and 34 and a spanner fin 32 joining the tubes 26 and 28. The fins 30, 32 and 34 may be shredded in accordance with the invention by means of a two-part die generally similar to the die set shown in FIG. 4 and 5 thereby to generate the configuration shown in FIG. 8. Double tube shredded articles of the type shown in FIG. 8 may be bent into serpentine or hairpin return bend configurations as shown in FIG. 9 and the ends thereof joined by U-shaped tubes 36 to form a heat exchanger. Again, the fin/tube combination with the shredded fins is dimensionally conformable as well as efficient in thermal transfer.

The embodiment of FIG. 3 has been successfully carried out on an extruded aluminum tube of approximately 5/16 inch OD, 0.25 inch ID, and having a fin of approximately 1.125 inches in length and a thickness of 0.031 inches. It is to be understood that these dimensions as well as the specifics of the foregoing description are illustrative and are not to be construed in a limiting sense. By way of example, the die set the die set shown in FIGS. 4 and 5 may be fabricated in several sections rather than integrally. Moreover, it may be advisable to shred in a two-step process; i.e., score the fins before forming the peaked strips. In addition, a cammed cutter bar may be employed to shred the fins.

The embodiments of the invention in which an exclusive property or privilege is claimed are defined as follows:

1. A method of manufacturing an integral extruded fin/tube combination wherein the tube forms a fluid conduit and the fin effects a thermal exchange between fluid in the tube and the surrounding environment comprising the steps of: extruding a relatively thin-walled tubular body having at least one radially extending and relatively thin-walled fin integral with the body, and thereafter splitting the fin over its entire length into a plurality of narrow and radially parallel strips which are integral only at the radial extremity thereof and alternately bent into reversely similar peaked configurations exhibiting substantial radial compliance as well as axial bunching and spreading capability whereby the tube/fin combination is both radially dimensionally conformable and easily bent.

2. A method as defined in claim 1 including the step of binding the radial fin into a peaked configuration prior to the step of splitting the fin, said peaked configuration being characterized by two substantially straight and integral legs which meet and form an acute angle.

3. The method defined in claim 1 wherein the step of splitting the fin is performed by placing the fin in a die and punching radially parallel and spaced portions of the fin out of the normal plane thereof and into a peaked configuration.

4. The method defined in claim 3 wherein the step of die punching is performed repeatedly at longitudinally spaced locations along said fin.

5. A method of manufacturing an integral extruded fin tube combination wherein the tube forms a fluid conduit and the fin effects a thermal exchange between the fluid in the tube and the surrounding environment comprising the steps of: extruding a relatively thin-walled tubular body having a plurality of circumferentially spaced radially extending thin-walled fins integral therewith and thereafter splitting the fins over substantially the entire lengths thereof into relatively narrow radially parallel strips which are integral only at the radial extremities thereof and which are alternately bent into reversely similar biplanar peaked configurations exhibiting substantial radial compliance as well as axial bunching and spreading capability whereby the tube/fin combination is both radially dimensionally conformable and easily bent.

6. The method defined in claim 5 wherein the fins are extruded in a relatively coplanar and flat configuration, the method comprising the further step of initially bending the fins into peaked configurations and thereafter performing the splitting step by placing the fins in a die set and punching spaced radially parallel portions thereof into oppositely peaked configurations.

7. The method defined in claim 5 wherein the tube/fin combination is constructed of aluminum.

* * * * *